US007169047B2

(12) United States Patent
Benbrahim

(10) Patent No.: US 7,169,047 B2
(45) Date of Patent: Jan. 30, 2007

(54) PROVIDING AN INDICATION OF A HIDDEN BONUS ON A CASINO GAMING APPARATUS

(75) Inventor: Jamal Benbrahim, Reno, NV (US)

(73) Assignee: IGT, Reno, NV (US)

( * ) Notice: Subject to any disclaimer, the term of this patent is extended or adjusted under 35 U.S.C. 154(b) by 107 days.

(21) Appl. No.: 10/250,737

(22) PCT Filed: Mar. 28, 2002

(86) PCT No.: PCT/US02/09977

§ 371 (c)(1),
(2), (4) Date: Jan. 26, 2004

(87) PCT Pub. No.: WO03/083799

PCT Pub. Date: Oct. 9, 2003

(65) Prior Publication Data

US 2004/0235548 A1 Nov. 25, 2004

(51) Int. Cl.
*G06F 17/00* (2006.01)
*G06F 19/00* (2006.01)

(52) U.S. Cl. ............................ 463/25; 463/16; 463/17; 463/18; 463/19; 463/20; 463/29; 463/30; 463/31

(58) Field of Classification Search .................. 463/20, 463/42; 273/273
See application file for complete search history.

(56) References Cited

U.S. PATENT DOCUMENTS 3,853,324 A 12/1974 Reiner et al.
3,877,700 A 4/1975 Moe
3,923,305 A 12/1975 Reiner et al.
4,012,046 A 3/1977 Liket
4,129,304 A 12/1978 Mager
4,198,052 A 4/1980 Gauselmann
4,363,485 A 12/1982 Edwall (Continued)

FOREIGN PATENT DOCUMENTS

DE 1 574 235 7/1971

(Continued)

OTHER PUBLICATIONS

Description of Poker written by Hoyle's Rules of Games published 1946-1983.

(Continued)

*Primary Examiner*—John M. Hotaling, II
*Assistant Examiner*—Milap Shah
(74) *Attorney, Agent, or Firm*—Bell, Boyd & Lloyd LLC

(57) ABSTRACT

A casino gaming apparatus may include a display unit capable of generating video images, a value input device, a user input device and a controller operatively coupled to the display unit. The controller may comprise a processor and a memory and may be programmed to allow a person to make a wager, to cause a video image to be generated on the display unit, to cause a bonus image to be generated on the display unit for a time period in response to a trigger event, to award a bonus in response to the person making an input via the user input device in response to generation of the bonus image on the display unit, and to determine a value payout associated with an outcome of the game.

34 Claims, 14 Drawing Sheets

U.S. PATENT DOCUMENTS

| | | | | |
|---|---|---|---|---|
| 4,448,419 | A | 5/1984 | Telnaes | |
| 4,550,916 | A | 11/1985 | Oritz | |
| 4,582,324 | A | 4/1986 | Koza et al. | |
| 4,586,707 | A | 5/1986 | McNeight et al. | |
| 4,593,904 | A | 6/1986 | Graves | |
| 4,615,527 | A | 10/1986 | Moss | |
| 4,618,150 | A | 10/1986 | Kimura | |
| 4,624,459 | A | 11/1986 | Kaufman | 273/143 R |
| 4,652,998 | A | 3/1987 | Koza et al. | |
| 4,666,160 | A | 5/1987 | Hamilton | |
| 4,695,053 | A | 9/1987 | Vazquez, Jr. et al. | |
| 4,756,532 | A | 7/1988 | Kamille | |
| 4,773,647 | A | 9/1988 | Okada et al. | |
| 4,781,377 | A | 11/1988 | McVean et al. | |
| 4,805,907 | A | 2/1989 | Hagiwara | |
| 4,926,327 | A | 5/1990 | Sidley | |
| 4,936,588 | A | 6/1990 | Rader et al. | |
| 4,948,133 | A | 8/1990 | Helm et al. | |
| 4,964,642 | A | 10/1990 | Kamille | |
| 5,001,632 | A | 3/1991 | Hall-Tipping | |
| 5,083,271 | A | 1/1992 | Thacher et al. | |
| 5,083,800 | A | 1/1992 | Lockton | |
| 5,114,155 | A | 5/1992 | Tillery et al. | |
| 5,116,055 | A | 5/1992 | Tracy | |
| 5,205,555 | A | 4/1993 | Humano | |
| 5,280,909 | A | 1/1994 | Tracy | |
| 5,299,810 | A | 4/1994 | Pierce et al. | |
| 5,308,065 | A | 5/1994 | Bridgeman et al. | |
| 5,340,317 | A | 8/1994 | Freeman | |
| 5,342,047 | A | 8/1994 | Heidel et al. | |
| 5,342,049 | A | 8/1994 | Wichinsky et al. | |
| 5,342,058 | A | 8/1994 | Giovannetti | |
| 5,344,144 | A | 9/1994 | Cannon | |
| 5,393,061 | A | 2/1995 | Manship et al. | |
| 5,397,125 | A | 3/1995 | Adams | |
| 5,409,225 | A | 4/1995 | Kelly et al. | |
| 5,411,268 | A | 5/1995 | Nelson et al. | |
| 5,411,271 | A | 5/1995 | Mirando | |
| 5,429,361 | A | 7/1995 | Raven et al. | |
| 5,449,173 | A | 9/1995 | Thomas et al. | |
| 5,524,888 | A | 6/1996 | Heidel | |
| 5,531,440 | A | 7/1996 | Babrowski et al. | |
| 5,536,016 | A | 7/1996 | Thompson | |
| 5,542,669 | A | 8/1996 | Charron et al. | |
| 5,544,892 | A | 8/1996 | Breeding | |
| 5,560,603 | A | 10/1996 | Seelig et al. | |
| 5,593,349 | A | 1/1997 | Miguel et al. | |
| 5,611,535 | A | 3/1997 | Tiberio | |
| 5,611,730 | A | 3/1997 | Weiss | |
| 5,618,045 | A | 4/1997 | Kagan et al. | |
| 5,628,684 | A | 5/1997 | Bouedec | |
| 5,643,088 | A | 7/1997 | Vaughn et al. | |
| 5,645,281 | A | 7/1997 | Hesse et al. | |
| 5,645,486 | A | 7/1997 | Nagao et al. | |
| 5,647,798 | A | 7/1997 | Falciglia | |
| 5,667,217 | A | 9/1997 | Kelly et al. | |
| 5,676,371 | A * | 10/1997 | Kelly et al. | 273/115 |
| 5,697,611 | A | 12/1997 | Kelly et al. | |
| 5,700,007 | A | 12/1997 | Kelly et al. | |
| 5,700,008 | A | 12/1997 | Lawlor et al. | |
| 5,704,612 | A | 1/1998 | Kelly et al. | |
| 5,707,285 | A | 1/1998 | Place et al. | |
| 5,722,891 | A | 3/1998 | Inoue | |
| 5,733,193 | A | 3/1998 | Allard et al. | |
| 5,743,523 | A | 4/1998 | Kelly et al. | |
| 5,743,532 | A | 4/1998 | Lafferty | |
| 5,755,621 | A | 5/1998 | Marks et al. | |
| 5,766,074 | A | 6/1998 | Cannon et al. | |
| 5,769,424 | A | 6/1998 | Kelly et al. | |
| 5,769,716 | A | 6/1998 | Saffari et al. | |
| 5,772,509 | A | 6/1998 | Weiss | |
| 5,779,544 | A | 7/1998 | Seelig et al. | |
| 5,779,549 | A | 7/1998 | Walker et al. | |
| 5,788,573 | A | 8/1998 | Baerlocher et al. | |
| 5,803,451 | A | 9/1998 | Kelly et al. | |
| 5,803,914 | A | 9/1998 | Ryals et al. | |
| 5,810,354 | A | 9/1998 | Banyai | |
| 5,816,918 | A | 10/1998 | Kelly et al. | |
| 5,823,874 | A | 10/1998 | Adams | |
| 5,833,536 | A | 11/1998 | Davids et al. | |
| 5,836,586 | A | 11/1998 | Marks et al. | |
| 5,848,932 | A | 12/1998 | Adams | |
| 5,851,148 | A | 12/1998 | Brune et al. | |
| 5,855,514 | A | 1/1999 | Kamille | |
| 5,860,648 | A | 1/1999 | Petermeier et al. | |
| 5,871,398 | A | 2/1999 | Schneier et al. | |
| 5,873,781 | A | 2/1999 | Keane | |
| 5,882,258 | A | 3/1999 | Kelly et al. | |
| 5,882,261 | A | 3/1999 | Adams | |
| 5,888,115 | A | 3/1999 | Shoemaker, Jr. et al. | |
| 5,902,184 | A | 5/1999 | Bennett et al. | |
| 5,910,046 | A | 6/1999 | Wada et al. | |
| 5,911,418 | A | 6/1999 | Adams | |
| 5,919,088 | A | 7/1999 | Weiss | |
| 5,941,770 | A | 8/1999 | Miers et al. | |
| 5,951,397 | A | 9/1999 | Dickinson | |
| 5,967,514 | A | 10/1999 | Kelly et al. | |
| 5,988,643 | A | 11/1999 | Awada | |
| 5,993,315 | A | 11/1999 | Strider et al. | |
| 5,997,401 | A | 12/1999 | Crawford | |
| 6,004,207 | A | 12/1999 | Wilson, Jr. et al. | |
| 6,007,426 | A | 12/1999 | Kelly et al. | |
| 6,012,722 | A | 1/2000 | Petermeier et al. | |
| 6,015,344 | A | 1/2000 | Kelly et al. | |
| 6,015,346 | A | 1/2000 | Bennett | |
| 6,019,369 | A | 2/2000 | Nakagawa et al. | |
| 6,019,374 | A | 2/2000 | Breeding | |
| 6,033,307 | A | 3/2000 | Vancura | |
| 6,047,963 | A | 4/2000 | Pierce et al. | |
| 6,048,271 | A | 4/2000 | Barcelou | |
| 6,050,895 | A | 4/2000 | Luciano, Jr. et al. | |
| 6,056,642 | A | 5/2000 | Bennett | |
| 6,062,981 | A | 5/2000 | Luciano, Jr. et al. | |
| 6,071,192 | A | 6/2000 | Weiss | |
| 6,089,976 | A | 7/2000 | Schneider et al. | |
| 6,089,977 | A | 7/2000 | Bennett | |
| 6,089,978 | A | 7/2000 | Adams | |
| 6,102,400 | A | 8/2000 | Scott et al. | |
| 6,102,402 | A | 8/2000 | Scott et al. | |
| 6,102,798 | A | 8/2000 | Bennett | |
| 6,110,039 | A | 8/2000 | Oh | |
| 6,110,041 | A | 8/2000 | Walker et al. | |
| 6,110,043 | A | 8/2000 | Olsen | |
| 6,117,007 | A | 9/2000 | Matsuyama et al. | |
| 6,117,008 | A | 9/2000 | Machiguchi | |
| 6,120,031 | A | 9/2000 | Adams | |
| 6,126,541 | A | 10/2000 | Fuchs | |
| 6,126,542 | A | 10/2000 | Fier | |
| 6,126,547 | A | 10/2000 | Ishimoto | |
| 6,135,453 | A | 10/2000 | Srichayaporn | |
| 6,135,884 | A | 10/2000 | Hedrick et al. | |
| 6,135,885 | A | 10/2000 | Lermusiaux | |
| 6,139,013 | A | 10/2000 | Pierce et al. | |
| 6,142,873 | A | 11/2000 | Weiss et al. | |
| 6,142,874 | A | 11/2000 | Kodachi et al. | |
| 6,146,273 | A | 11/2000 | Olsen | |
| 6,149,156 | A | 11/2000 | Feola | |
| 6,159,095 | A | 12/2000 | Frohm et al. | |
| 6,159,097 | A | 12/2000 | Gura | |
| 6,159,098 | A | 12/2000 | Slomiany et al. | |
| 6,165,070 | A | 12/2000 | Nolte et al. | |
| 6,173,955 | B1 * | 1/2001 | Perrie et al. | 273/146 |
| 6,174,235 | B1 | 1/2001 | Walker et al. | |
| 6,174,237 | B1 | 1/2001 | Stephenson | |

| | | | | |
|---|---|---|---|---|
| 6,190,255 | B1 | 2/2001 | Thomas et al. | |
| 6,193,606 | B1 | 2/2001 | Walker et al. | |
| 6,210,279 | B1 | 4/2001 | Dickinson | |
| 6,220,593 | B1 | 4/2001 | Pierce et al. | |
| 6,220,961 | B1 | 4/2001 | Keane et al. | |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,227,971 | B1 | 5/2001 | Weiss | 463/20 |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,238,288 | B1 | 5/2001 | Walker et al. | |
| 6,251,013 | B1 | 6/2001 | Bennett | |
| 6,261,177 | B1 | 7/2001 | Bennett | |
| 6,267,669 | B1 | 7/2001 | Luciano, Jr. et al. | |
| 6,270,409 | B1 | 8/2001 | Shuster | |
| 6,270,411 | B1 | 8/2001 | Gura et al. | |
| 6,279,910 | B1 | 8/2001 | De Keller | |
| 6,287,194 | B1 | 9/2001 | Okada et al. | |
| 6,290,600 | B1 | 9/2001 | Glasson | |
| 6,290,603 | B1 | 9/2001 | Luciano, Jr. | |
| 6,293,866 | B1 | 9/2001 | Walker et al. | |
| 6,302,790 | B1 | 10/2001 | Brossard | |
| 6,309,298 | B1 | 10/2001 | Gerou | |
| 6,309,299 | B1 | 10/2001 | Weiss | |
| 6,309,300 | B1 | 10/2001 | Glavich | |
| 6,312,334 | B1 | 11/2001 | Yoseloff | |
| 6,315,660 | B1 | 11/2001 | Demar et al. | |
| 6,322,309 | B1 | 11/2001 | Thomas et al. | 413/20 |
| 6,328,649 | B1 | 12/2001 | Randall et al. | |
| 6,346,043 | B1 | 2/2002 | Colin et al. | |
| 6,347,996 | B1 | 2/2002 | Gilmore et al. | 463/17 |
| 6,364,765 | B1 | 4/2002 | Walker et al. | |
| 6,364,766 | B1 | 4/2002 | Anderson et al. | |
| 6,364,768 | B1 | 4/2002 | Acres et al. | |
| 6,375,187 | B1 | 4/2002 | Baerlocher | |
| 6,379,245 | B2 | 4/2002 | De Keller | |
| 6,386,974 | B1 | 5/2002 | Adams | |
| 6,406,369 | B1 | 6/2002 | Baerlocher et al. | |
| 6,413,160 | B1 | 7/2002 | Vancura | |
| 6,413,161 | B1 | 7/2002 | Baerlocher et al. | |
| 6,435,511 | B1 | 8/2002 | Vancura et al. | |
| 6,439,995 | B1 | 8/2002 | Hughs-Baird et al. | |
| 6,443,837 | B1 | 9/2002 | Jaffe et al. | |
| 6,454,651 | B1 | 9/2002 | Yoseloff | |
| 6,467,771 | B1 | 10/2002 | De Keller | |
| 6,488,580 | B1 | 12/2002 | Robb | |
| 6,506,118 | B1 | 1/2003 | Baerlocher et al. | |
| 6,522,312 | B2 | 2/2003 | Ohshima et al. | |
| 6,537,150 | B1 | 3/2003 | Luciano et al. | |
| 6,554,704 | B2 | 4/2003 | Nicastro et al. | |
| 6,569,015 | B1 | 5/2003 | Baerlocher et al. | |
| 6,572,473 | B1 | 6/2003 | Baerlocher | |
| 6,582,306 | B1 | 6/2003 | Kaminkow | |
| 6,599,193 | B2 | 7/2003 | Baerlocher et al. | |
| 6,602,137 | B2 | 8/2003 | Kaminkow et al. | |
| 6,605,002 | B2 | 8/2003 | Baerlocher | |
| 6,607,438 | B2 | 8/2003 | Baerlocher et al. | |
| 6,632,140 | B2 * | 10/2003 | Berman et al. | 463/18 |
| 6,632,141 | B2 | 10/2003 | Webb et al. | |
| 6,648,754 | B2 | 11/2003 | Baerlocher et al. | |
| 6,692,003 | B2 | 2/2004 | Potter et al. | |
| 6,733,386 | B2 | 5/2004 | Cuddy et al. | |
| 6,761,632 | B2 | 7/2004 | Basenmer et al. | |
| 6,767,284 | B1 | 7/2004 | Koza | |
| 6,769,983 | B2 | 8/2004 | Slomiany | |
| 6,780,103 | B2 | 8/2004 | Bansemer et al. | |
| 6,780,111 | B2 | 8/2004 | Cannon et al. | |
| 6,786,824 | B2 | 9/2004 | Cannon | |
| 6,811,482 | B2 | 11/2004 | Letovsky | |
| 6,832,959 | B2 | 12/2004 | Baerlocher | |
| 6,837,793 | B2 | 1/2005 | McClintic | |
| 6,852,027 | B2 | 2/2005 | Kaminkow et al. | |
| 6,863,606 | B1 | 3/2005 | Berg et al. | |
| 6,918,834 | B2 | 7/2005 | Vancura | |
| 6,923,720 | B2 * | 8/2005 | Loose | 463/16 |
| 6,929,545 | B2 | 8/2005 | Vancura | |
| 6,942,568 | B2 | 9/2005 | Baerlocher | |
| 6,942,571 | B1 | 9/2005 | McAllister et al. | |
| 2002/0008356 | A1 | 1/2002 | De Keller | |
| 2002/0049084 | A1 | 4/2002 | Hugh-Baird et al. | |
| 2002/0059252 | A1 | 5/2002 | Yamaguchi | |
| 2002/0107065 | A1 * | 8/2002 | Rowe | 463/20 |
| 2002/0160825 | A1 | 10/2002 | Nicastro et al. | |
| 2003/0013519 | A1 | 1/2003 | Bennett | |
| 2003/0064773 | A1 | 4/2003 | Baerlocher et al. | |
| 2003/0104854 | A1 | 6/2003 | Cannon | |
| 2003/0104860 | A1 | 6/2003 | Cannon et al. | |
| 2003/0114209 | A1 | 6/2003 | Ritner, Jr. et al. | |
| 2003/0114218 | A1 | 6/2003 | McClintic | |
| 2003/0114219 | A1 | 6/2003 | McClintic | |
| 2003/0114220 | A1 | 6/2003 | McClintic | |
| 2003/0119576 | A1 | 6/2003 | McClintic et al. | |
| 2003/0119581 | A1 | 6/2003 | Cannon et al. | |
| 2003/0125102 | A1 | 7/2003 | Cannon | |
| 2003/0125107 | A1 | 7/2003 | Cannon | |
| 2003/0171144 | A1 | 9/2003 | Letovsky | |
| 2004/0116173 | A1 | 6/2004 | Baerlocher | |

FOREIGN PATENT DOCUMENTS

| | | | |
|---|---|---|---|
| DE | 199 26 280 | A1 | 3/2000 |
| DE | 100 26 366 | A1 | 10/2001 |
| EP | 375190 | A2 | 6/1990 |
| EP | 0688002 | A1 | 12/1995 |
| EP | 0 702 340 | A2 | 3/1996 |
| EP | 0 874 337 | A1 | 10/1998 |
| EP | 0945837 | A2 | 9/1999 |
| GB | 1 242 298 | | 8/1971 |
| GB | 2 072 395 | | 2/1981 |
| GB | 2 066 991 | | 7/1981 |
| GB | 2 097 160 | | 12/1981 |
| GB | 2 096 376 | A | 10/1982 |
| GB | 2 097 160 | A | 10/1982 |
| GB | 2 100 905 | | 1/1983 |
| GB | 2 100 905 | A | 1/1983 |
| GB | 2 137 392 | A | 10/1984 |
| GB | 2 142 457 | A | 1/1985 |
| GB | 2 144 644 | A | 3/1985 |
| GB | 2 152 263 | A | 7/1985 |
| GB | 2 153 572 | A | 8/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | | 4/1987 |
| GB | 2 180 682 | A | 4/1987 |
| GB | 2 181 589 | A | 4/1987 |
| GB | 2 182 186 | | 5/1987 |
| GB | 2 183 882 | A | 6/1987 |
| GB | 2 191 030 | | 12/1987 |
| GB | 2 207 268 | | 1/1989 |
| GB | 2 222 712 | A | 3/1990 |
| GB | 2 226 436 | | 6/1990 |
| GB | 2 226 436 | A | 6/1990 |
| GB | 2 226 907 | A | 7/1990 |
| GB | 2 242 300 | | 9/1991 |
| GB | 2 258 164 | | 2/1993 |
| GB | 2 262 642 | | 6/1993 |
| GB | 2 262 642 | A | 6/1993 |
| GB | 2262642 | | 6/1993 |
| GB | 2 271 262 | A | 4/1994 |
| RU | 17678 | U1 | 4/2001 |
| WO | WO 96/25725 | | 8/1996 |
| WO | WO 98/00210 | | 1/1998 |

| | | |
|---|---|---|
| WO | WO 98/51384 | 11/1998 |
| WO | WO 00/12186 | 3/2000 |
| WO | WO 01/58546 A1 | 8/2001 |

OTHER PUBLICATIONS

Jackpot Party brochure and article published by WMS Gaming Inc. in 1998.

Mikohn Ripley's Believe It or Not article written by Strictly Slots, published in Jun. 2001.

Mountain Coin Machine Distributing—Redemption Games—Cyclone™ from www.mountaincoin.com printed Feb. 28, 2002.

Press Your Luck article by Strictly Slots, dated 2000.

Primetime Amusements Redemption Games advertisement, printed from http://www.primetimeamusements.com/redemption.htm on Feb. 28, 2002.

Table Games advertisement brochure, published by ShuffleMaster in 2000.

Weiner Distributing ICE Cyclone™ from www.winerd.com. printed on Feb. 28, 2002.

International Search Report for PCT/US02/09977 completed Aug. 21, 2003.

Texas Tea Advertisement written by IGT, published in 2000.

Fey, Slot Machines, A Pictorial History of the First 100 Years, Liberty Belle Books, 1983, pp. 215, 219.

Press Your Luck Article by Strictly Slots, dated 2000.

English translation of claims 1 to 5 from RU 17678U1.

* cited by examiner

FIG. 10
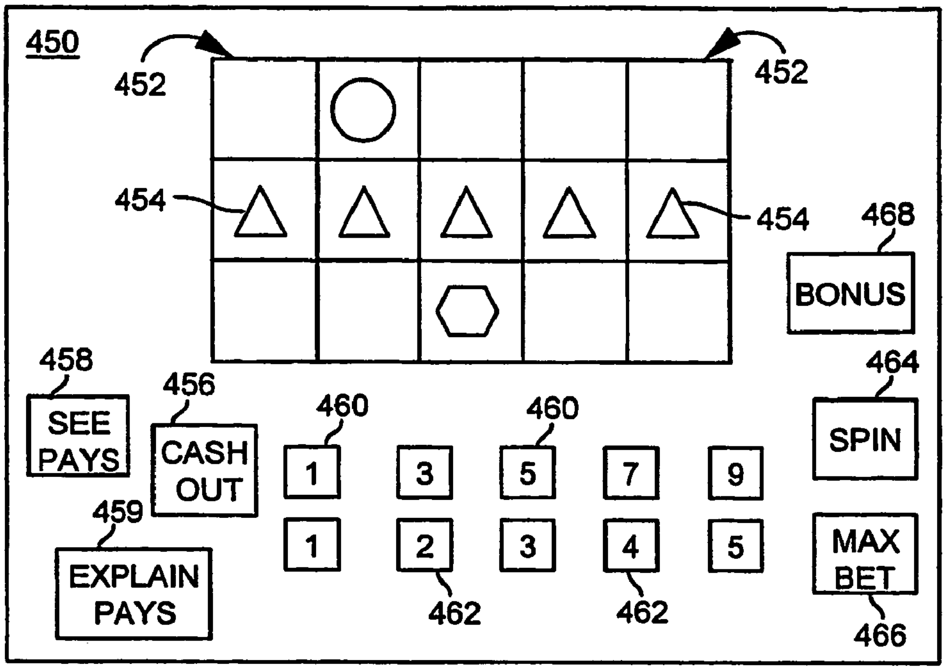
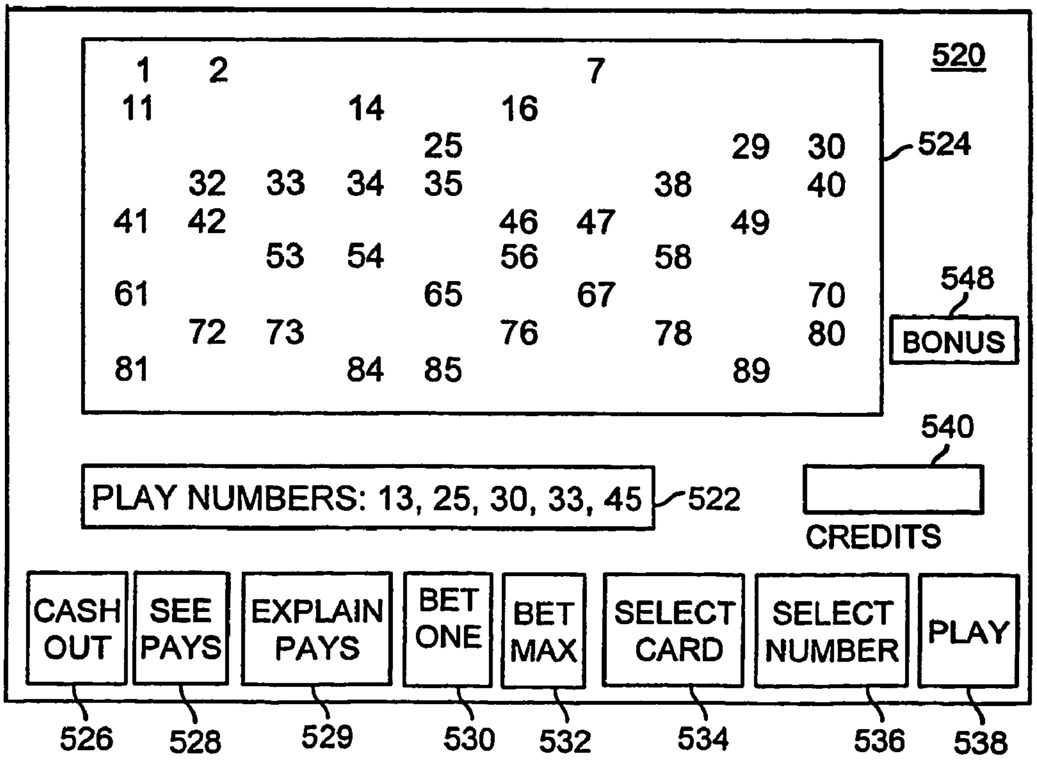
FIG. 11

PROVIDING AN INDICATION OF A HIDDEN BONUS ON A CASINO GAMING APPARATUS

BACKGROUND OF THE INVENTION

The present invention is directed to a gaming apparatus that is capable of providing a bonus, the gaming apparatus allowing customers to play casino games such as poker, blackjack, slots, keno, and bingo.

Casino gaming apparatus that awards a bonus based on a bonus game or round is generally known in the art. In particular, the bonus game or round may be provided if certain conditions are met. The players may be provided with a listing of certain conditions to reach the bonus game or round. For example, a bonus game may be played if a player achieves a certain configuration of symbols in a slots game. In another example, a bonus round may be played during a casino game if the player accumulates a particular number of credits. As a result, players may be accustomed to the typical conditions to reach a bonus game or round. Furthermore, players may be required to achieve a particular outcome of the bonus game or round to be awarded a bonus. For example, a bonus is awarded if the player wins the bonus game or round.

SUMMARY OF THE INVENTION

In one aspect, the invention is directed to a casino gaming apparatus that may include a display unit capable of generating video images, a value input device, a user input device, and a controller operatively coupled to the display unit. The controller may comprise a processor and a memory and may be programmed to allow a person to make a wager, to cause a video image to be generated on the display unit, to cause a bonus image to be generated on the display unit for a time period in response to a trigger event, to award a bonus in response to a person making an input via the user input device in response to generation of the bonus image on the display unit, and to determine a value payout associated with an outcome of the game.

The video image may represent a video casino game selected from the group of video casino games consisting of video poker, video blackjack, video slots, video keno and video bingo, in which case the video image may comprise an image of at least five playing cards if the video casino game comprises video poker; the video image may comprise an image of a plurality of simulated slot machine reels if the video casino game comprises video slots; the video image may comprise an image of a plurality of playing cards if the video casino game comprises video blackjack; the video image may comprise an image of a plurality of keno numbers if the video casino game comprises video keno; and the video image may comprise an image of a bingo grid if the video casino game comprises video bingo.

The user input device may comprise a bonus button disposed in a fixed position, and the user input device may comprise a touch-sensitive input device associated with the display unit.

The controller may be programmed to cause, after the time period, the bonus image to change from a revealed state to a concealed state on the display unit. The controller may be programmed to award the bonus in response to an area on the display unit being pressed after the expiration of the time period. The area may correspond to the area at which the bonus image was generated on the display unit. The controller may be programmed to cause a plurality of bonus images to be generated on the display unit in response to the trigger event. The trigger event may comprise a predetermined number of said games played by a person or a predetermined number of credits accumulated by a person.

The invention is also directed to a casino gaming method that may comprise causing a video game image to be generated, causing a bonus image to be generated on a display unit for a time period in response to a trigger event, awarding a bonus in response to a person making an input in response to generation of the bonus image on the display unit, and determining a value payout associate with an outcome of the game.

In another aspect, the invention is directed to a memory having a computer program being capable of being used in connection with a gaming apparatus. The memory may comprise a first memory portion physically configured in accordance with computer program instructions that would cause the gaming apparatus to allow a person to make a wager, a second memory portion physically configured in accordance with computer program instructions that would cause the gaming apparatus to cause a video image to be generated on a display unit, a third memory portion physically configured in accordance with computer program instructions that would cause the gaming apparatus to cause a bonus image to be generated on the display unit for a time period in response to a trigger event, a fourth memory portion physically configured in accordance with computer program instructions that would cause the gaming apparatus to award a bonus in response to a person making an input via a user input device in response to generation of the bonus image on the display unit, and a fifth memory portion physically configured in accordance with computer program instructions that would cause the gaming apparatus to determine a value payout associated with an outcome of the game.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Figure 1:
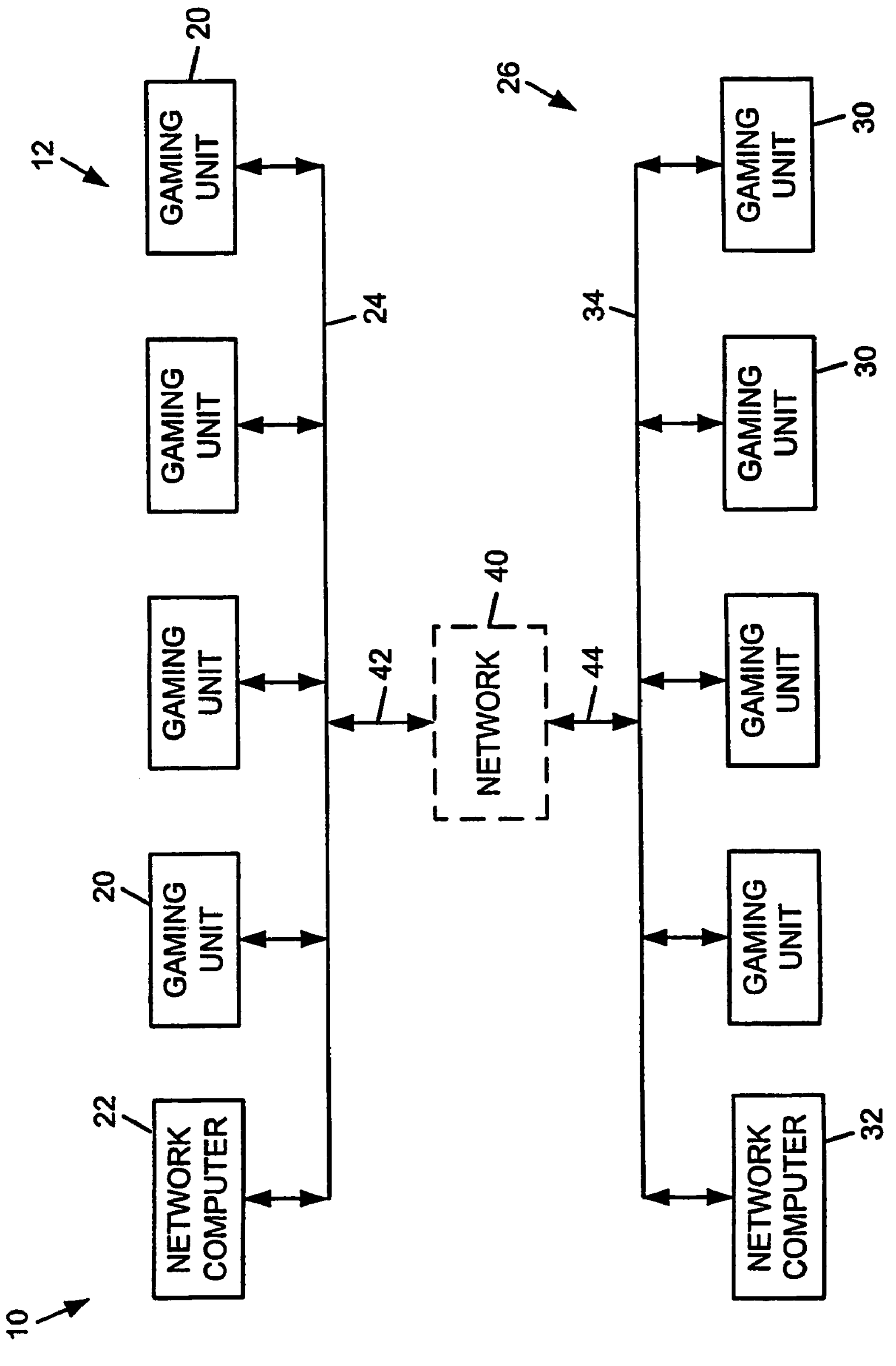
FIG. 1 is a perspective view of an embodiment of a casino gaming apparatus in accordance with the invention.

FIG. 1 illustrates an embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
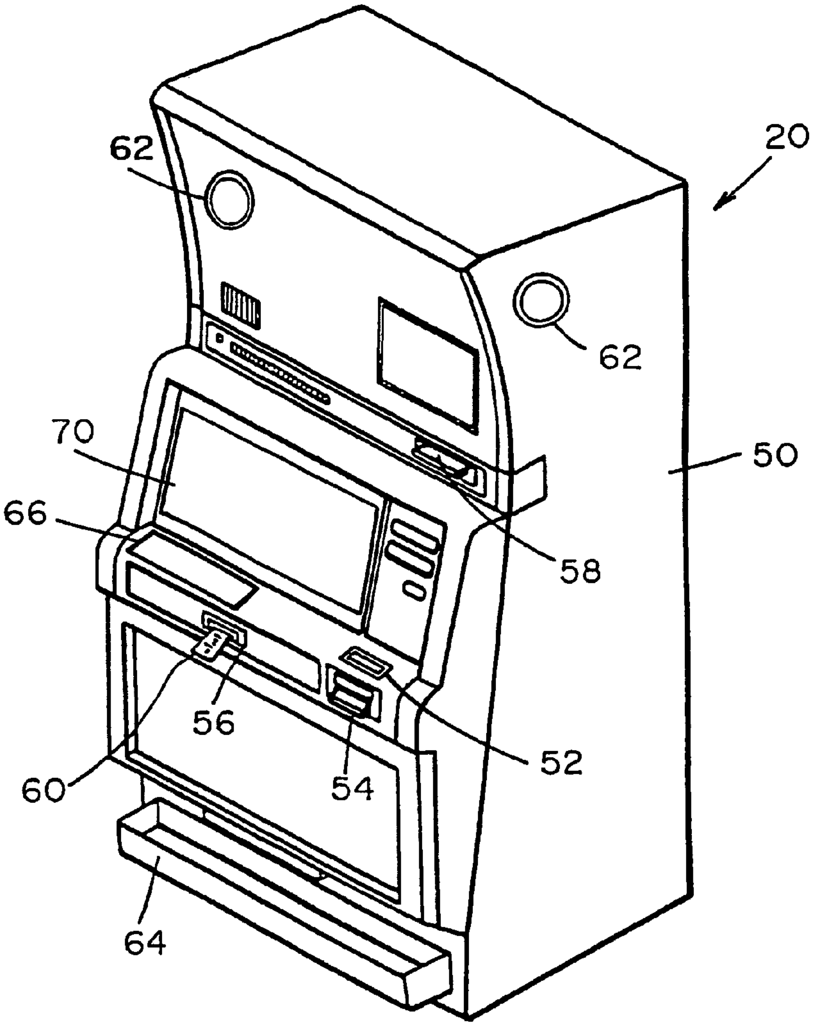
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term “value” may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player’s gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of push buttons or touch-sensitive areas that may be pressed by a player to select games, make wagers, make gaming decisions, etc.

Figure 2A:
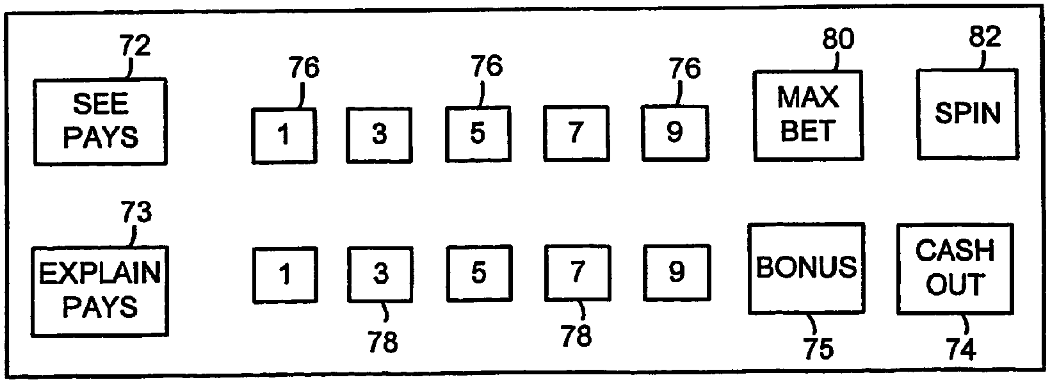
FIG. 2A is illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64. The control panel 66 may also include a "Bonus" button 75 that may be activated during a bonus routine 325 as described in detail below. The bonus button 75 may be disposed in a fixed position on the controller panel 66.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 75, 76, 78, 80, 82. It should be understood that that rectangle simply designates, for ease of reference, an area in which the buttons 72, 74, 75, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20.

Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
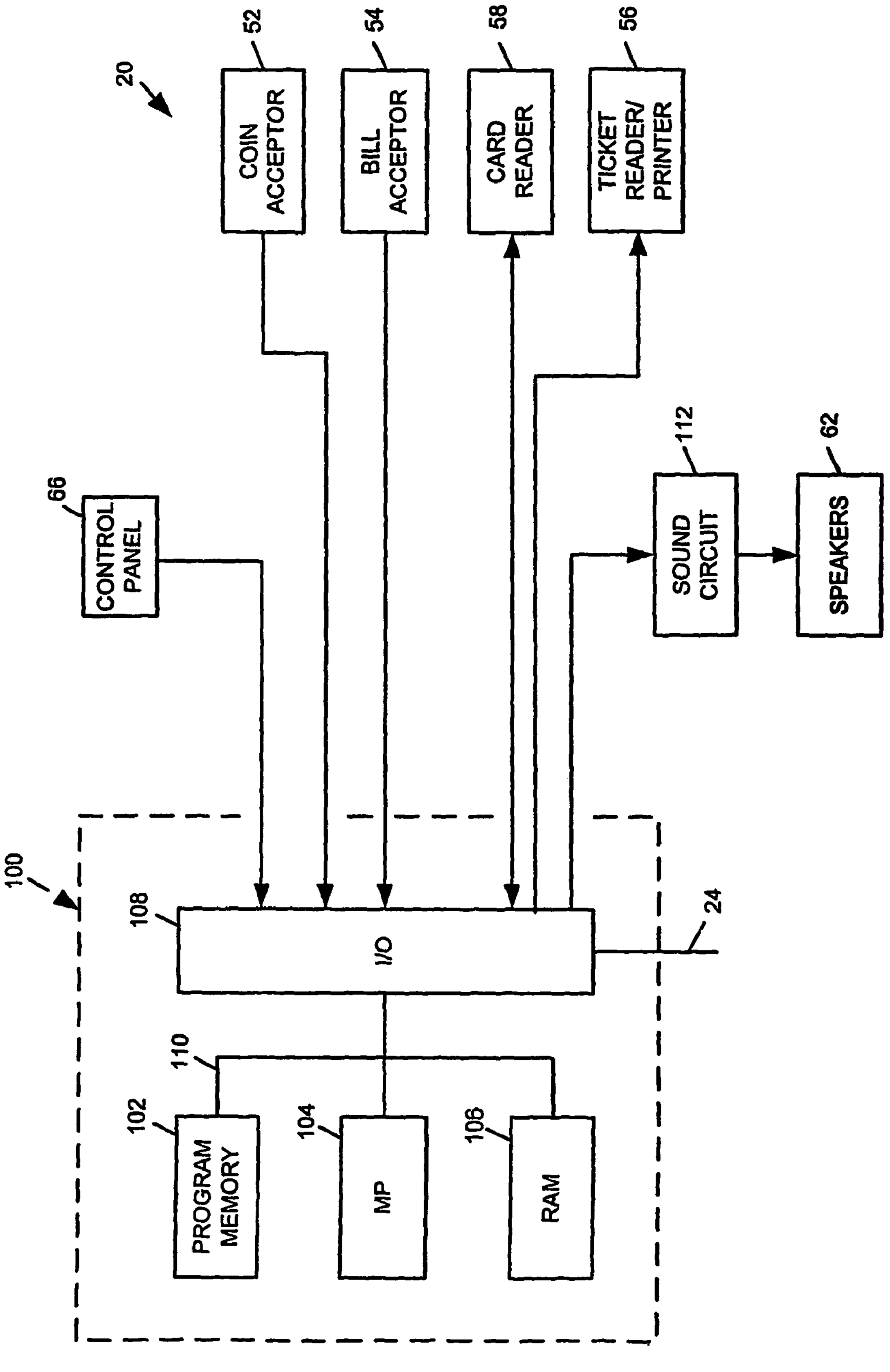
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (P) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 4:
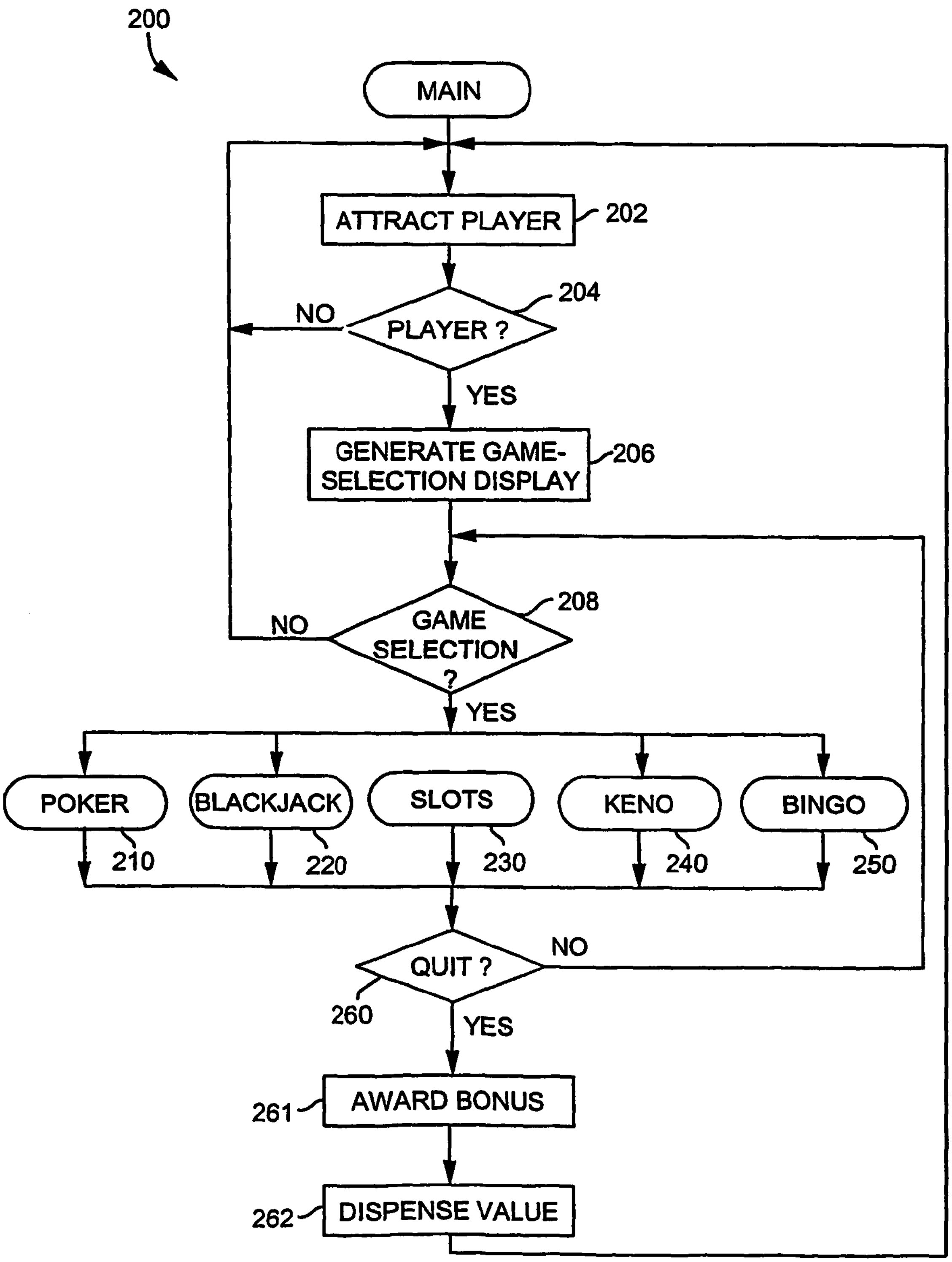
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, the player may press a "Cash Out" button to withdraw the player's cumulative value or number of credits based on the outcome of game(s) played.

If the player cashes out (i.e., quits) as determined at block 260, the main routine 200 may proceed to block 261 where a bonus may be awarded. The bonus may include, for example, additional value or number of credits or additional game(s). The controller 100 may generate one or more video images and/or one or more sound segments, such as voice or music, to indicate that the bonus is awarded. Block 262 may be used to dispense value to the player based on the outcome of the game(s) played by the player and/or the bonus. The operation may then return to block 202. If the play did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5A:
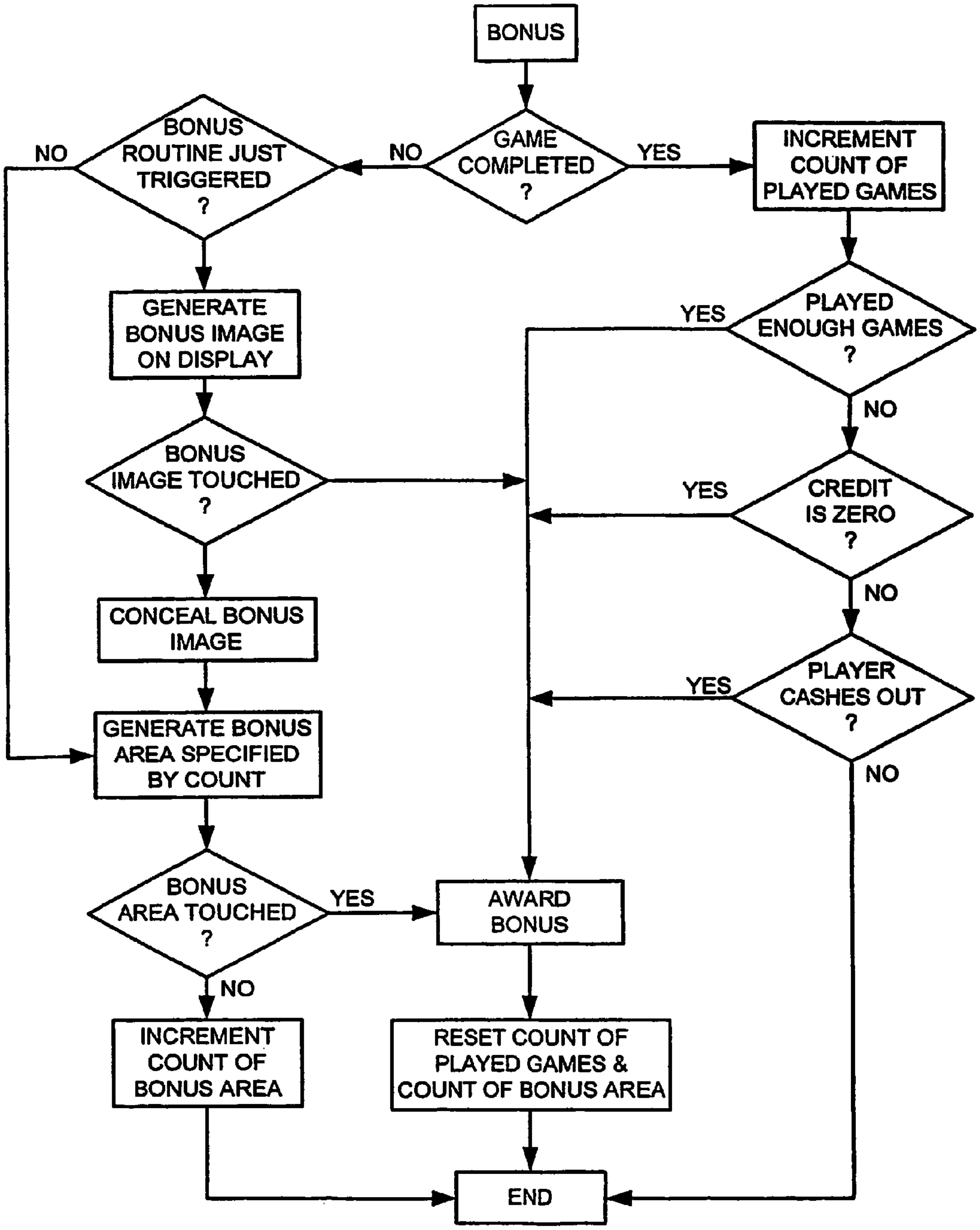
FIG. 5A is a flowchart of an embodiment of a bonus routine that may be performed by one or more of the gaming units.
Figure 5B:
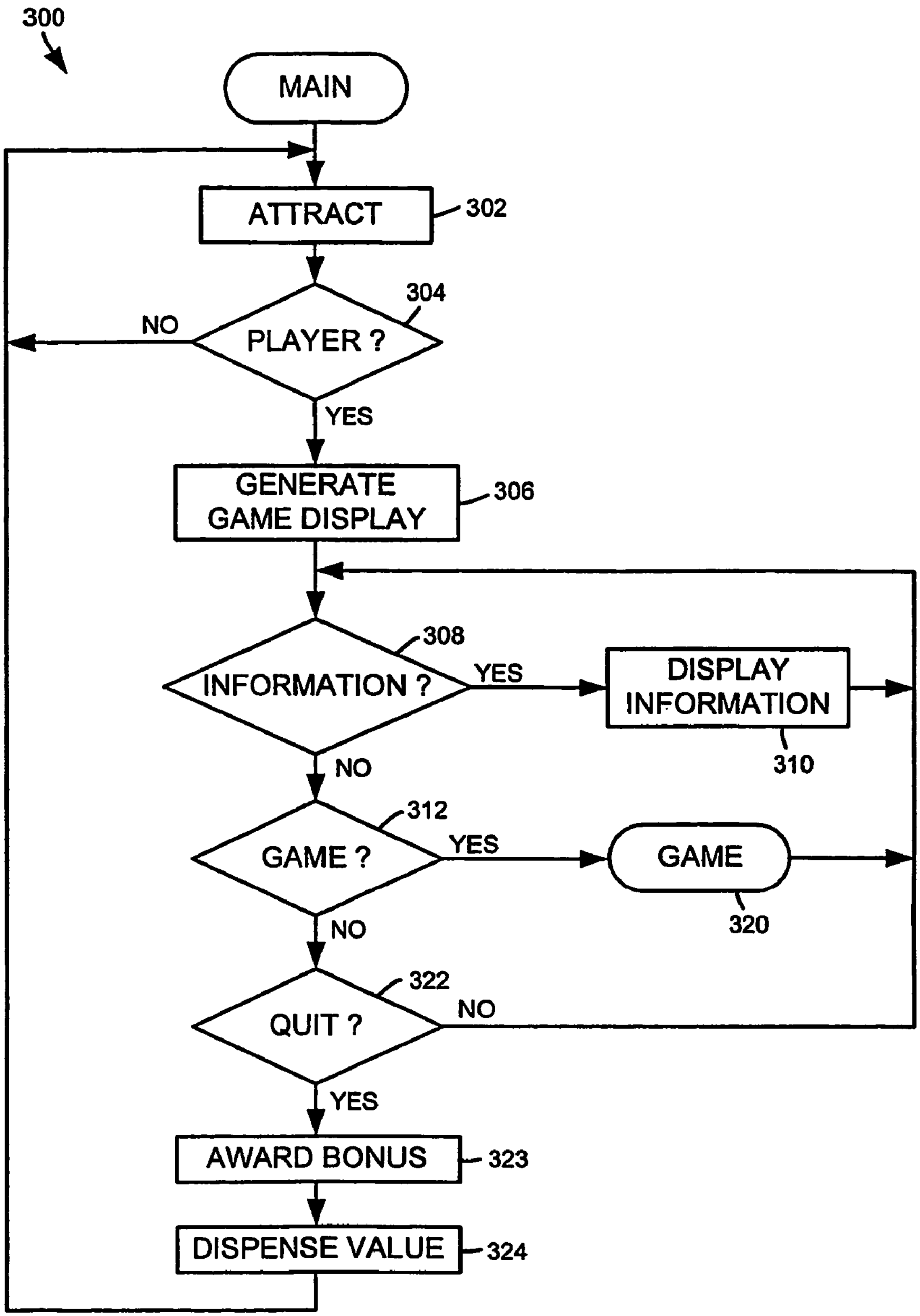
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, the player may press a "Cash Out" button to withdraw the player's cumulative value or number of credits based on the outcome of game(s) played.

If the player cashes out (i.e., quit) as determined at block 322, the main routine 300 may proceed to block 323, where a bonus may be awarded. The bonus may include, for example, additional value or number of credits or additional game(s). The controller 100 may generate one or more video images and/or one or more sound segments, such as voice or music, to indicate that the bonus is awarded. Block 324 may be used to dispense value to the player based on the outcome of the game(s) played by the player and/or the bonus. The routine may then return to block 302. If the play did not wish to quit as determined at block 322, the routine may return to block 308 where the game display may again be generated to prompt the play to deposit value into the game unit 20.

Bonus

A bonus routine may be utilized for any one of the game routines (i.e., the video poker routine 210, the blackjack routine 220, the slots routine 230, the video keno routine 240, and the video bingo routine 250). FIG. 5A is a flowchart of the bonus routine 325 that may be stored in the memory of the controller 100. Referring to FIG. 5A, the bonus routine 325 may begin operation at block 327 during which the controller 100 may determine whether a game is completed. If the game is completed, the controller 100 at block 329 may increment a count that keeps track of how many games played by a player. Block 330 may be used to determine whether the player played a predetermined number of played games, in which case the routine may proceed to block 333 where a bonus may be awarded. In particular, the bonus may be awarded when the count that keeps track of how many games played by the player equals to the predetermined number. If the predetermined number is eight, for example, the routine may award a bonus after eight games played by the player. The controller 100 may cause one or more video images and/or one or more sound segments, such as voice or music, to indicate that the bonus is awarded. At block 335, the controller 100 may reset the count that keeps track of how many bonus images to display on the display unit 70. For example, the count may be reset to one after a bonus is awarded. The routine may end after block 335. It should be noted that although block 335 is shown incorporated after block 333 of the bonus routine 325, block 335 may be provided at other points in the bonus routine 325 such as after block 337. In that case, the controller 100 at block 335 may reset the count that keeps track of how many bonus images to display on the display unit 70 after block 337 where the controller 100 determines whether the player made an input such as touching or pressing a previous bonus image or a previous area of the display unit 70 as described in detail below.

If the player did not play a predetermined number of games as determined at block 330, the controller 100 at block 331 may determine whether the player's cumulative value or number of credits is zero, in which case the routine proceeds to block 333 where a bonus may be awarded. However, if there are game credits remaining as determined at block 331, the routine may then branch to block 337 as described in detail below. Although the above blocks used to determine whether to award a bonus (i.e., blocks 327, 329, 330, 331, 333 and 335) have been shown and described as being incorporated into the bonus routine 325, those blocks are capable of being incorporated into a separate routine that may be provided at other points in any of the game routines (i.e., the video poker routine 210, the blackjack routine 220, the slots routine 230, the video keno routine 240, and the video bingo routine 250). For example, those blocks may be provided at the end of each of the game routines mentioned above.

Referring back to block 327, if the game is not completed, the controller 100 at block 337 may determine whether a previous bonus image or a previous area of the display unit 70 is touched. If neither a previous bonus image nor a previous area is touched, the controller 100 at block 339 may increment a count that keeps track of how many bonus image(s) to generate on the display unit 70. At block 341, a trigger event may cause a number of bonus image(s) to be generated for a time period on the display unit 70. The number of bonus image(s) may include, for example, an image generated in a random non-fixed position of the display unit 70 during performance of a game to prompt the player to make an input for a bonus. Furthermore, the number of bonus image(s) generated at block 343 may be specified by the count at block 339 that keeps track of how many bonus image(s) to generate on the display unit 70. The trigger event, which may cause a number bonus image(s) to be generated, may include a number of credits accumulated by the player and/or a number of games played by the player. For example, the number of bonus images may be generated after three games played by the player. In another example, the number of bonus images may be generated after the player accumulated thirty credits. If a trigger event did not occur as determined at block 341, the routine may end.

At block 345, the controller 100 may determine whether the player made an input via a user input device in response to generation of the bonus image on the display unit 70. The user input device may include, for example, the bonus button 75 disposed on a fixed position on the controller panel 66 as described in detail above or a touch-sensitive input device associated with the display unit 70 at block 343. If an input is not made prior to the expiration of the time period, the routine may cause at block 347 the bonus image to change from a revealed state to a concealed state on the display unit 70. For example, the player may have one second to make an input before the bonus image is changed from the revealed state to the concealed state. In the concealed state, the bonus image may not be visible on display unit 70 to the player. However, at block 349, the routine may determine whether an area of the display unit 70 is pressed, in which case the routine proceeds to block 333 where a bonus may be awarded. The area of the display unit 70 may correspond to the area at which the bonus image was generated on the display unit 70. The area of the display unit 70 may also be a random portion of the display unit 70. For example, the area of the display unit 70 may be an upper-left portion, an upper-right portion, a middle portion, a lower-left portion, or a lower right portion of the display unit 70. If an area of the display unit 70 is not pressed as determined at block 349, the routine may end.

Video Poker

Figure 6:
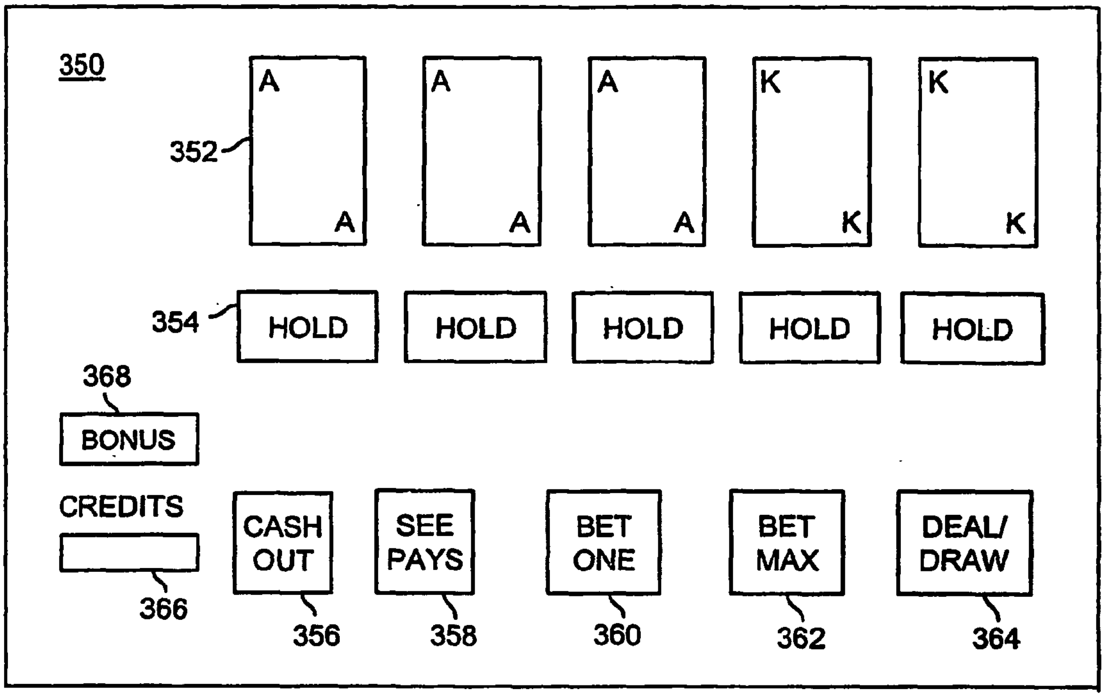
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70. Furthermore, a bonus image 368 may be generated on the display 350 by the bonus routine 325, as described in detail above, during performance of the video poker routine 210. The bonus image 368 may include, for example, an image generated in a random non-fixed position on the display 350 to prompt the player to make an input via a user input device for a bonus.

Figure 8:
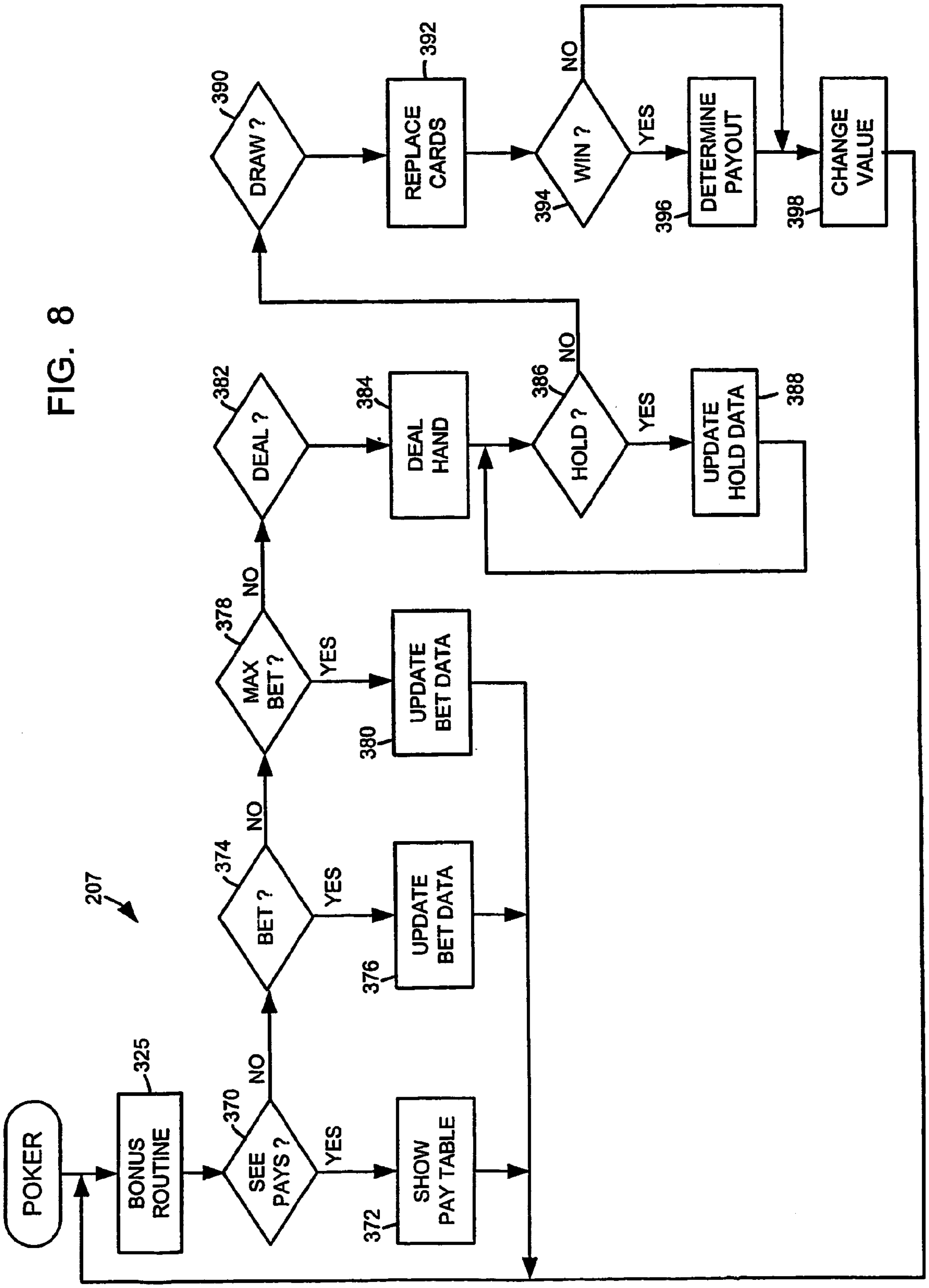
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, the video poker routine 210 may include the bonus routine 325 to award a bonus during performance of the poker routine 210. The bonus routine 325, for example, may generate the bonus image 368 on the display 350 to prompt a player make an input for a bonus as described in detail above. It should be noted that although the bonus routine 325 is shown incorporated at the beginning of the video poker routine 210, the bonus routine 325 may be provided at one or more other points in the video poker routine 210 such as at the end of the video poker routine 210 after block 398.

At block 370, the video poker routine 210 may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
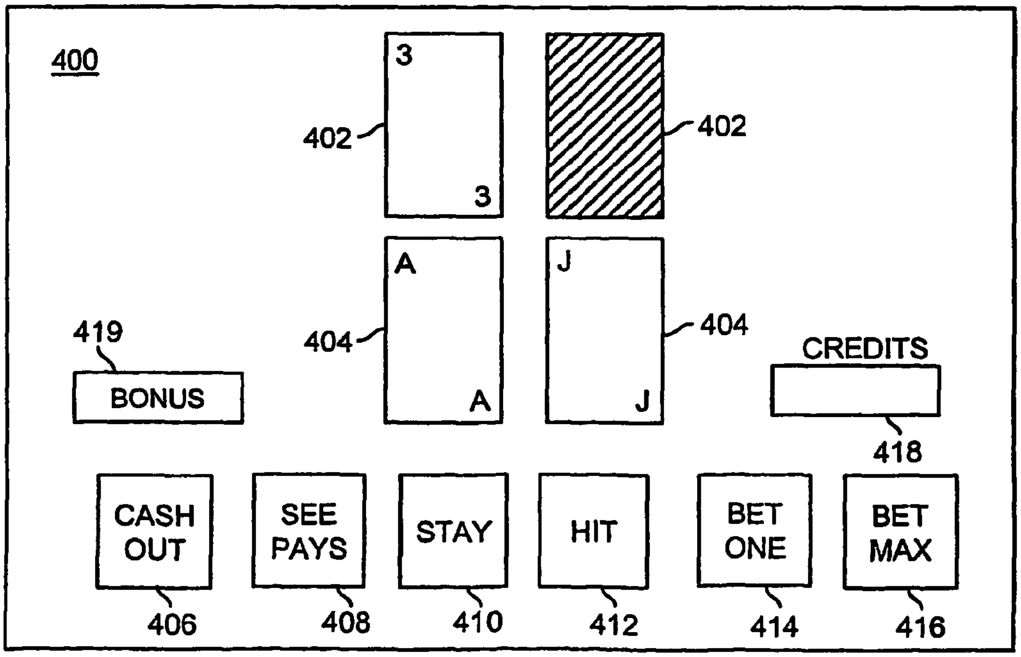
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70. Furthermore, a bonus image 419 may be generated on the display 400 by the bonus routine 325, as described in detail above, during performance of the video blackjack routine 210. The bonus image 419 may be same as the bonus image 368 generated on the display 350. In particular, the bonus image 419 may include, for example, an image generated in a random non-fixed position on the display 400 to prompt the player to make an input via a user input device for a bonus.

Figure 9:
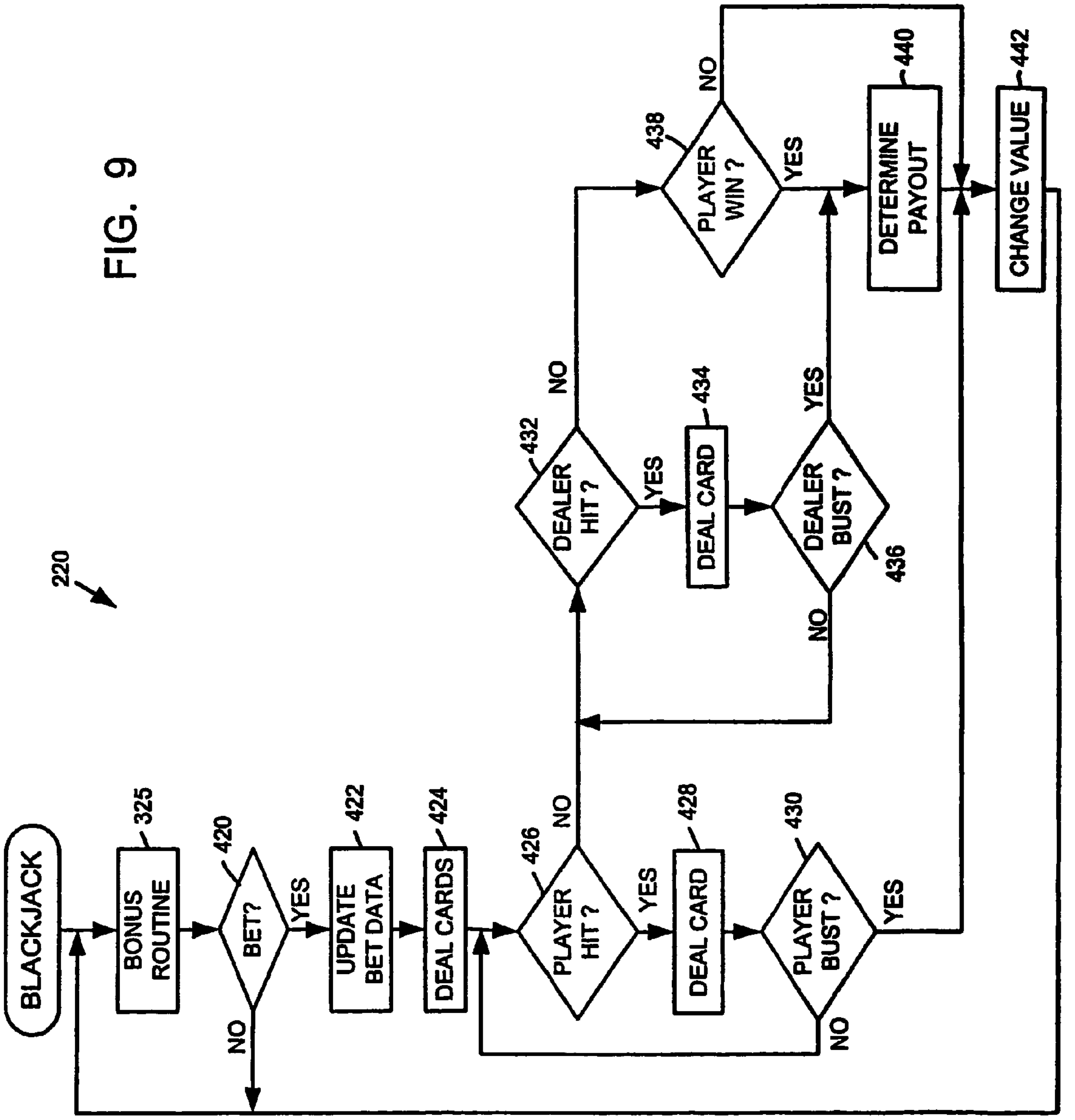
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may include the bonus routine 325 to award a bonus during performance of the blackjack routine 220. The bonus routine 325, for example, may generate the bonus image 419 on the display 400 to prompt a player make an input for a bonus as described in detail above. It should be noted that although the bonus routine 325 is shown incorporated at the beginning of the video blackjack routine 220, the bonus routine 325 may be provided at one or more other points in the video blackjack routine 220 such as at the end of the video blackjack routine 220 after block 442.

At block 420, the video blackjack routine 220 may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 396. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable. Furthermore, a bonus image 468 may be generated on the display 450 by the bonus routine 325, as described in detail above, during performance of the slots routine 210. The bonus image 468 may be same as the bonus image 368 generated on the display 350 during performance of the poker routine 210 and the bonus image 419 generated on the display 400 during performance of the blackjack routine 220. The bonus image 468 may include, for example, an image generated in a random non-fixed position on the display 450 to prompt the player to make an input via a user input device for a bonus.

Figure 12:
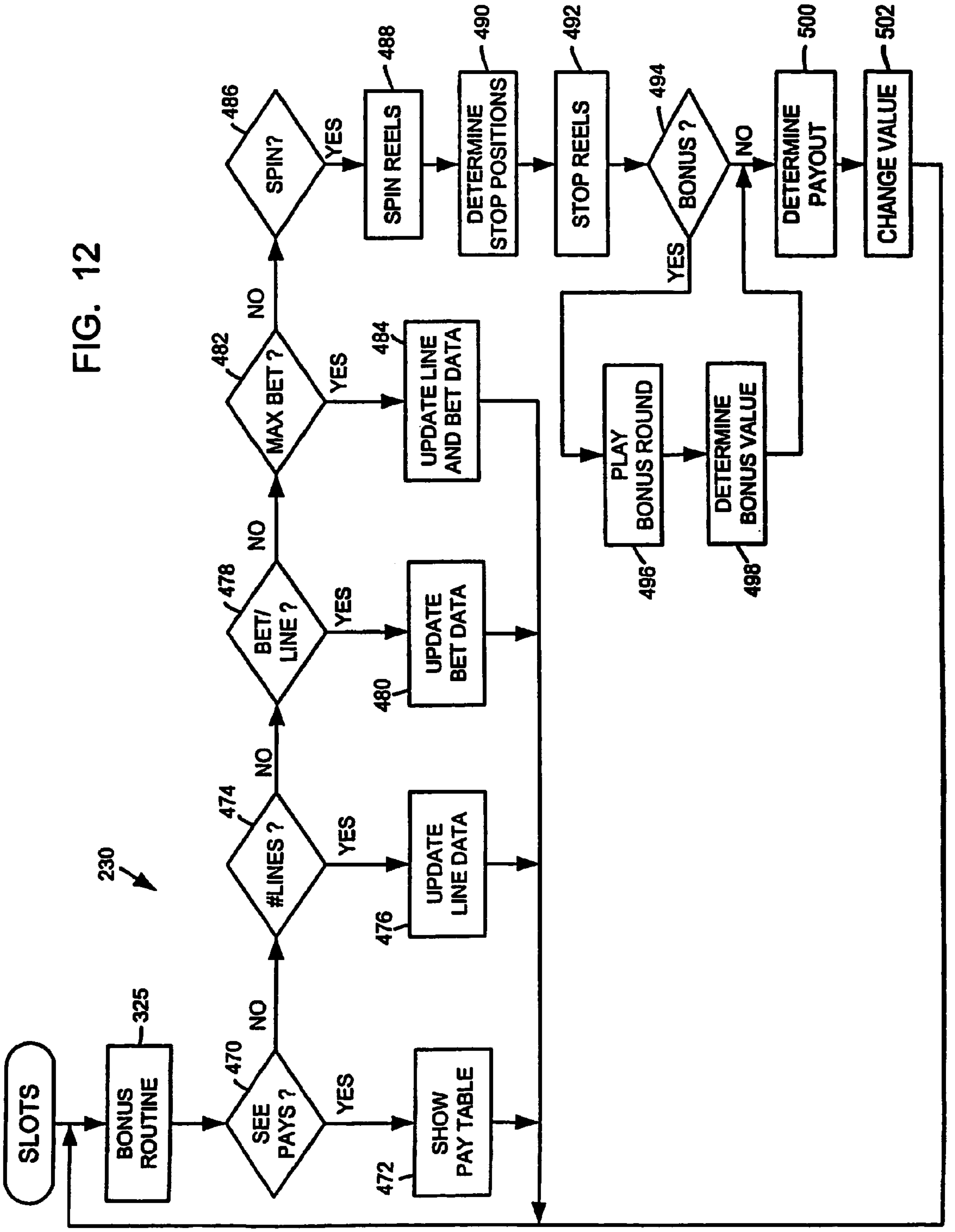
FIG. 12 is a flowchart of an embodiment of a slots routine that may be performed by one or more of the gaming units.

FIG. 12 is a flowchart of the slots routine 230 shown schematically in FIG. 10. Referring to FIG. 12, the slots routine 230 may include the bonus routine 325 to award a bonus during performance of the slots routine 230. The bonus routine 325, for example, may generate the bonus image 468 on the display 450 to prompt a player to make an input for a bonus as described in detail above. It should be noted that although the bonus routine 325 is shown incorporated at the beginning of the slots routine 230, the bonus routine 325 may be provided at one or more other points in the slots routine 230 such as at the end of the slots routine 230 after block 502.

At block 470, the slots routine 230 may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70. Furthermore, a bonus image 548 may be generated on the display 520 by the bonus routine 325, as described in detail above, during performance of the video keno routine 210. The bonus image 548 may be same as the bonus image 368 generated on the display 350 during performance of the poker routine 210, the bonus image 419 generated on the display 400 during performance of the blackjack routine 220, and the bonus image 548 generated on the display 520 during performance of the bingo routine 230. The bonus image 548 may include, for example, an image generated in a random non-fixed position on the display 520 to prompt the player to make an input via a user input device for a bonus.

Figure 13:
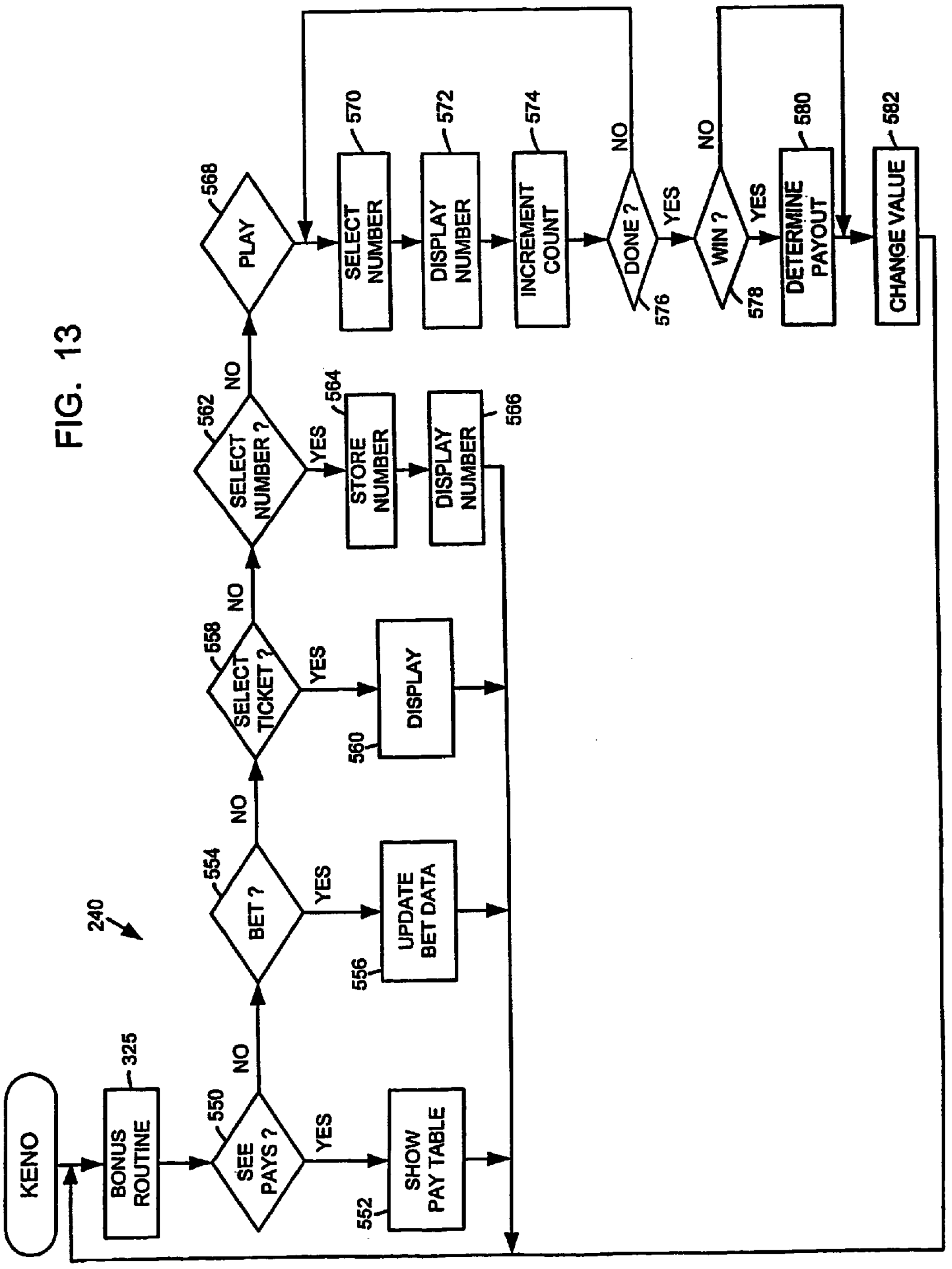
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, he keno routine 240 may include the bonus routine 325 to award a bonus during performance of the keno routine 240. The bonus routine 325, for example, may generate the bonus image 548 on the display 520 to prompt a player to make an input for a bonus as described in detail above. It should be noted that although the bonus routine 325 is shown incorporated at the beginning of the keno routine 240, the bonus routine 325 may be provided at one or more other points in the keno routine 240 such as at the end of the keno routine 240 after block 582.

At block 550, the keno routine 240 may determine whether the player has requested payout information, such as by activating the "SeePays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
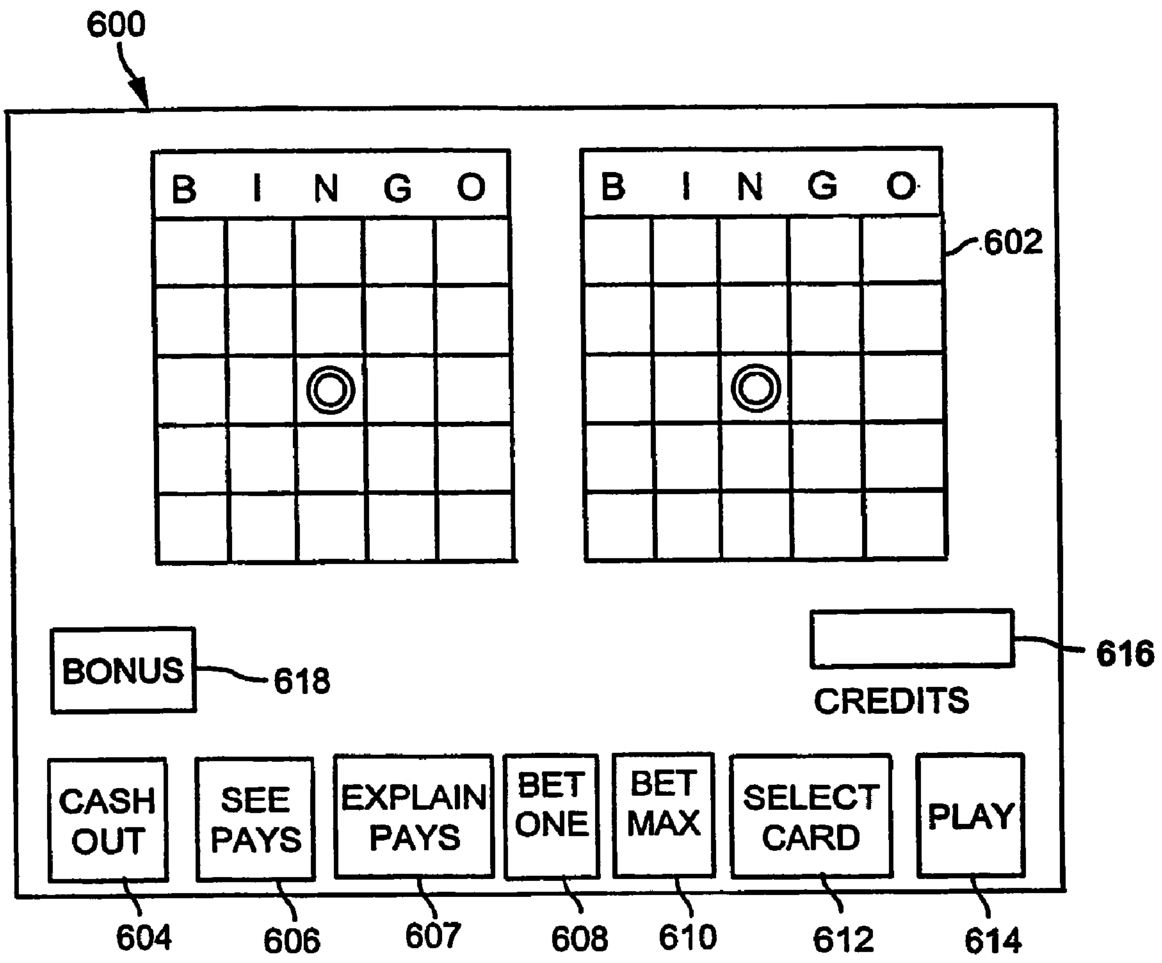
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "lay" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70. Furthermore, a bonus image 618 may be generated on the display 600 by the bonus routine 325, as described in detail above, during performance of the video bingo routine 210. The bonus image 618 may be same as the bonus image 368 generated on the display 350 during performance of the poker routine 210, the bonus image 419 generated on the display 400 during performance of the blackjack routine 220, the bonus image 548 generated on the display 520 during performance of the bingo routine 230, and the bonus image 618 generated on the display 600 during performance of the keno routine 240. The bonus image 618 may include, for example, an image generated in a random non-fixed position on the display 600 to prompt the player to make an input via a user input device for a bonus.

Figure 15:
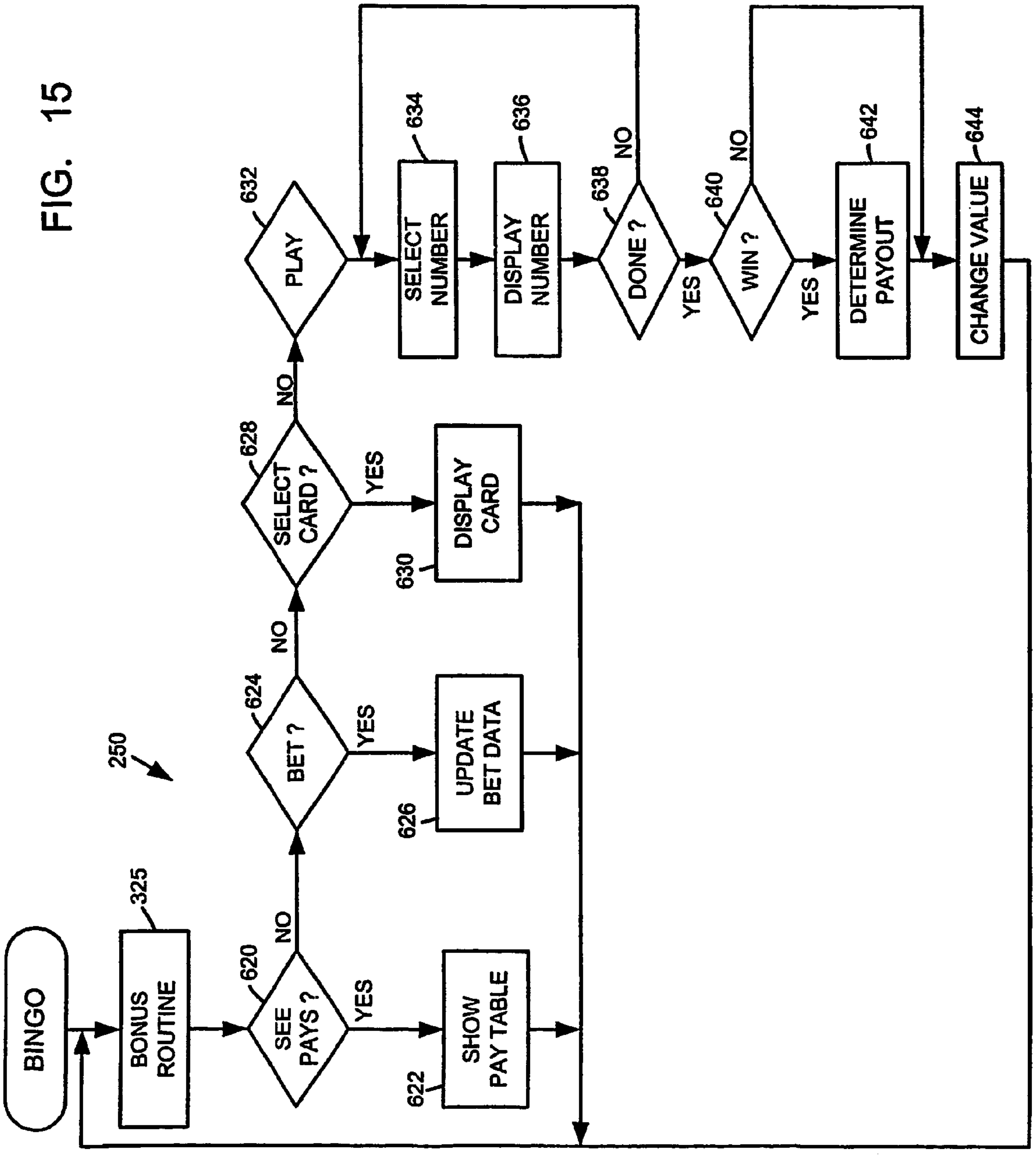
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, the bingo routine 250 may include the bonus routine 325 to award a bonus during performance of the bingo routine 250. The bonus routine 325, for example, may generate the bonus image 618 on the display 600 to prompt a player to make an input for a bonus as described in detail above. It should be noted that although the bonus routine 325 is shown incorporated at the beginning of the bingo routine 250, the bonus routine 325 may be provided at one or more other points in the bingo routine 250 such as at the end of the bingo routine 250 after block 644.

At block 620, the bingo routine 250 may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One. Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:

a display unit that is capable of generating video images;

a value input device;

a user input device;

a controller operatively coupled to said display unit, said value input device, and said user input device, said controller comprising a processor and a memory operatively coupled to said processor, said controller being programmed to allow a person to make a wager, said controller being programmed to cause a video image to be generated on said display unit, said video image representing a game selected from the group of games consisting of video poker, video blackjack, video slots, video keno and video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, said controller being programmed to cause a first number of bonus images to be generated on said display unit to indicate the person has achieved a hidden bonus, simultaneously with said displayed game for a first time period in response to a trigger event, said first number of bonus images being at least one and after said first time period, to cause the generation of the first number of bonus images on the display unit to stop for a second subsequent time period;

said controller being programmed to award the hidden bonus in response to the person making an input via said user input device in response to the generation of said first number of bonus images on said display unit, said controller being programmed to cause a second number of bonus images to be generated on said display unit to indicate the person has achieved the hidden bonus, simultaneously with said displayed game for a third subsequent time period if the person does not make an input via said user input device in response to the generation of said first number of bonus images on said display unit during said second time period, wherein the second number of bonus images is greater than the first number of bonus images, said controller being programmed to award the hidden bonus in response to the person making an input via said user input device in response to the generation of said second number bonus images on said display unit, and said controller being programmed to determine a value payout associated with an outcome of said game represented by said video image.

2. A gaming apparatus as defined in claim 1, wherein said user input device comprises a bonus button disposed in a fixed position.

3. A gaming apparatus as defined in claim 1, wherein said user input device comprises a touch-sensitive input device associated with said display unit.

4. A gaming apparatus as defined in claim 1, wherein said controller is programmed to award said bonus in response to an area on said display unit being pressed during said second time period.

5. A gaming apparatus as defined in claim 4, wherein said area corresponds to the area at which said first number of bonus images were generated on said display unit.

6. A gaming apparatus as defined in claim 1, wherein said controller is programmed to cause a plurality of the first number of bonus images to be generated on said display unit in response to said trigger event.

7. A gaming apparatus as defined in claim 1, wherein said trigger event comprises a predetermined number of said games played by the person or a predetermined number of credits accumulated by the person.

8. A gaming system comprising a plurality of gaming apparatuses as defined in claim 1, said gaming apparatuses being interconnected to form a network of gaming apparatuses.

9. A gaming system as defined in claim 8, wherein said gaming apparatuses are interconnected via the Internet.

10. A gaming apparatus, comprising:

a display unit that is capable of generating video images;

a value input device;

a controller operatively coupled to said display unit and said value input device, said controller comprising a processor and a memory operatively coupled to said processor, said controller being programmed to allow a person to make a wager, said controller being programmed to cause a video image to be generated on said display unit, said video image representing a game selected from the group of games consisting of video poker, video blackjack, video slots, video keno and video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, said controller being programmed to cause a bonus image to be generated on said display unit to indicate the person has achieved a hidden bonus simultaneously with said displayed game for a first time period, to cause the generation of the bonus image on the display to stop for a second time period, said controller being programmed to award the hidden bonus in response to the person making an input via said user input device in response to the generation of said bonus image on said display unit during the second time period, and said controller being programmed to determine a value of the hidden bonus to provide the player in response to a predetermined number of games played by the person if the person does not make an input via said user input device in response to the generation of said bonus image on said display unit during the second time period, and said controller being programmed to determine a value payout associated with an outcome of said game.

11. A gaming apparatus, comprising:

a display unit that is capable of generating video images;

a value input device;

a user input device;

a controller operatively coupled to said display unit, said value input device and said user input device, said controller comprising a processor and a memory operatively coupled to said processor, said controller being programmed to allow a person to make a wager;

said controller being programmed to cause a video image to be generated on said display unit, said video image representing a casino game, said controller being programmed to cause a first number of bonus images to be generated on said display unit to indicate the person has achieved a hidden bonus, simultaneously with said displayed casino game for a first time period in response to a trigger event, said first number of bonus images being at least one and after said first time period, to cause the generation of the first number of bonus images on the display unit to stop for a second subsequent time period;

said controller being programmed to award the hidden bonus in response to the person making an input via said user input device in response to the generation of the first number of bonus images on said display unit during said second time period, said first number of bonus images being at least one;

said controller being programmed to cause a second number of bonus images to be generated on said display unit to indicate the person has achieved a hidden bonus, simultaneously with said displayed casino game for a third subsequent time period if the person does not make an input via said user input device in response to the generation of said first number of bonus images on said display unit during said second time period, wherein the second number of bonus images is greater than the first number of bonus images;

said controller being programmed to award the hidden bonus in response to the person making an input via said user input device in response to the generation of the second number of bonus images on said display unit if the person does not make an input via said user input device in response to the generation of said first number of bonus images on said display unit during the second time period, wherein the second number of bonus images is greater than the first number of bonus images, and said controller being programmed to determine, after said video image has been displayed, a value payout associated with an outcome of said casino game.

12. A gaming apparatus as defined in claim 11, wherein said user input device comprises a bonus button disposed in a fixed position.

13. A gaming apparatus as defined in claim 11, wherein said user input device comprises a touch-sensitive input device associated with said display unit.

14. A gaming apparatus as defined in claim 11, wherein said controller is programmed to award said bonus in response to an area on said display unit being pressed during said second time period.

15. A gaming apparatus as defined in claim 14, wherein said area corresponds to the area at which said first number of bonus images were generated on said display unit.

16. A gaming apparatus as defined in claim 11, wherein said controller is programmed to cause a plurality of the first number of bonus images to be generated on said display unit in response to said trigger event.

17. A gaming apparatus as defined in claim 11, wherein said trigger event comprises a predetermined number of said games played by the person or a predetermined number of credits accumulated by the person.

18. A gaming system, comprising a plurality of gaming apparatuses as defined in claim 11, said gaming apparatuses being interconnected to form a network of gaming apparatuses.

19. A gaming apparatus, comprising:

a display unit that is capable of generating video images;

a value input device;

a user input device;

a controller operatively coupled to said display unit, said value input device and said user input device, said controller comprising a processor and a memory operatively coupled to said processor, said controller being programmed to allow a person to make a wager, said controller being programmed to allow the person to make a payline selection, said controller being programmed to cause a video image to be generated on said display unit, said video image comprising a plurality of simulated slot machine reels of a slots game, each of said slot machine reels having a plurality of slot machine symbols, said controller being programmed to cause a first number of bonus images to be generated on said display unit to indicate the person has achieved a hidden bonus, simultaneously with said displayed slots game for a first time period in response to a trigger event, wherein said first number is at least one and after said first time period, to cause the generation of the first number of bonus images on the display unit to stop for a second subsequent time period, said controller being programmed to award the hidden bonus in response to the person making an input via said user input device in response to the generation of said first number of bonus images on said display unit during said second time period, said controller being programmed to cause a second number of bonus images to be generated on said display unit to indicate the person has achieved a hidden bonus, simultaneously with said displayed slots game—for a third subsequent time period if the person does not make an input via said user input device in response to the generation of said first number of bonus images on said display unit during said second time period, wherein the second number of bonus images is greater than the first number of bonus images, said controller being programmed to award the hidden bonus in response to the person making an input via said user input device in response to the generation of said second number of bonus images on said display unit, and said controller being programmed to determine a value payout associated with an outcome of said slots game, said outcome of said slots game being based on a configuration of said slot machine symbols.

20. A gaming apparatus as defined in claim 19, wherein said controller is programmed to allow a user to select a number of paylines.

21. A gaming apparatus as defined in claim 19, wherein said user input device comprises a bonus button disposed in a fixed position.

22. A gaming apparatus as defined in claim 19, wherein said user input device comprises a touch-sensitive input device associated with said display unit.

23. A gaming apparatus as defined in claim 19, wherein said controller is programmed to award said bonus in response to an area on said display unit being pressed during said second time period.

24. A gaming apparatus as defined in claim 23, wherein said area corresponds to the area at which said first number of bonus images was generated on said display unit.

25. A gaming apparatus as defined in claim 19, wherein said controller is programmed to cause a plurality of the first number of bonus images to be generated on said display unit in response to said trigger event.

26. A gaming apparatus as defined in claim 19, wherein said trigger event comprises a predetermined number of said games played by the person or a predetermined number of credits accumulated by the person.

27. A gaming system comprising a plurality of gaming apparatuses as defined in claim 19, said gaming apparatuses being interconnected to form a network of gaming apparatuses.

28. A gaming method comprising:

causing a video game image to be generated, said video game image representing a game selected from the group of games consisting of video poker, video blackjack, video slots, video keno and video bingo, said video game image comprising an image of at least five playing cards if said game comprises video poker, said video game image comprising an image of a plurality of simulated slot machine reels if said game comprises video slots, said video game image comprising an image of a plurality of playing cards if said game comprises video blackjack, said video game image comprising an image of a plurality of keno numbers if said game comprises video keno, and said video game image comprising an image of a bingo grid if said game comprises video bingo;

causing a first number bonus images to be generated on a display unit to indicate the person has achieved a hidden bonus, simultaneously with said displayed game for a first time period in response to a trigger event;

causing the generation of the first number of bonus images on the display unit to stop for a second subsequent time period;

awarding the hidden bonus in response to the person making an input in response to the generation of said first number of bonus images on said display unit during said second time period, said first number of bonus images being at least one;

causing a second number of bonus images to be generated on said display unit to indicate the person has achieved a hidden bonus, simultaneously with said displayed game—for a third subsequent time period if the person does not make an input in response to the generation of said first number of bonus images on said display unit during said second time period, wherein the second number of bonus images is greater than the first number of bonus images, awarding the hidden bonus in response to the person making an input in response to the generation of said second number of bonus images on said display unit; and determining a value payout associated with an outcome of said game.

29. A gaming method as defined in claim 28, additionally comprising:

awarding said bonus in response to an area on said display unit being pressed during said second time period.

30. A gaming method as defined in claim 28, additionally comprising causing a plurality of the first number of bonus images to be generated on said display unit in response to said trigger event.

31. A gaming method as defined in claim 28, wherein said trigger event comprises a predetermined number of said games played by the person or a predetermined number of credits accumulated by the person.

32. A memory having a computer program stored therein, said computer program being capable of being used in connection with a gaming apparatus, said memory comprising:

a first memory portion physically configured in accordance with computer program instructions that would cause said gaming apparatus to allow a person to make a wager;

a second memory portion physically configured in accordance with computer program instructions that would cause said gaming apparatus to cause a video image to be generated on a display unit, said video image representing a game selected from the group of games consisting of video poker, video blackjack, video slots, video keno and video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises, video keno, said video image comprising an image of a bingo grid if said game comprises video bingo, a third memory portion physically configured in accordance with computer program instructions that would cause said gaming apparatus to cause a first number of bonus images to be generated on said display unit to indicate the person has achieved a hidden bonus, simultaneously with said displayed game—for a first time period in response to a trigger event, said first number of bonus images being at least one and after said first time period, to cause the generation of the first number of bonus images on the display unit to stop for a second subsequent time period, a fourth memory portion physically configured in accordance with computer program instructions that would cause said gaming apparatus to award the hidden bonus in response to the person making an input via a user input device in response to the generation of said first number of bonus images on the said display unit during the second time period, a fifth memory portion physically configured in accordance with computer program instructions that would cause a second number of bonus images to be generated on said display unit to indicate the person has achieved a hidden bonus, simultaneously with said displayed game for a third subsequent time period if the person does not make an input via said user input device in response to the generation of said first number of bonus images on said display unit during the second period of time, wherein the second number of bonus images is greater than the first number of bonus images, a sixth memory portion physically configured in accordance with computer program instructions that would cause said gaming apparatus to award the hidden bonus in response to the person making an input via said user input device in response to the generation of said second number of bonus images on said display unit, and a seventh memory portion physically configured in accordance with computer program instructions that would cause said gaming apparatus to determine a value payout associated with an outcome of said game.

33. A memory as defined in claim 32, additionally comprising an eighth memory portion physically configured in accordance with computer program instructions that would award said bonus in response to an area on said display unit being pressed during said second time period.

34. A memory as defined in claim 32, additionally comprising an eighth memory portion physically configured in accordance with computer program instructions that would cause a plurally of the first number of bonus images to be generated on said display unit In response to said trigger event.

* * * * *